United States Patent [19]
Jensen

[11] 3,747,720
[45] July 24, 1973

[54] HUB INSERT FOR REAR WHEEL ASSEMBLIES OF MOTORCYCLES TO RECEIVE AND TRANSMIT DRIVING POWER

[75] Inventor: Melville Leroy Jensen, Bellevue, Wash.

[73] Assignee: Jensen Enterprises, Inc., Bellevue, Wash.

[22] Filed: Dec. 10, 1970

[21] Appl. No.: 96,941

[52] U.S. Cl. .................................. 180/33 R, 64/14
[51] Int. Cl. ............................................ B62d 61/00
[58] Field of Search ............. 29/401; 64/14, 27 NM; 180/25, 72, 30, 32, 33 R, 33 B

[56] References Cited
UNITED STATES PATENTS
3,475,923   11/1969   Spence .................................. 64/14
3,318,408   5/1967    Hopkins .......................... 180/33 R Primary Examiner—Gerald M. Forlenza
Assistant Examiner—John Mannix
Attorney—Roy E. Mattern, Jr.

[57] ABSTRACT

In many motorcycles engine power is transmitted to the rear wheel through a chain and sprocket drive with the transfer of power occurring between a final drive flange secured to the sprocket and a hub of the rear wheel. Both the drive flange and hub have radially positioned drive ribs, also called lugs, drive plates, and power transmitters. They are generally integrally formed in sizes and locations to intermesh with more than adequate radial and axial clearance. In the clearance spaces remaining, resilient damping units are fitted. During transmission of engine power to the rear wheel, all the propelling forces are directed through the respective drive ribs of the drive flange and rear wheel hub and always through the intermediate resilient damping units.

These dampers are subject to destructive wear especially if any excessive axial clearance should develop between the final drive flange and hub. If failing damping units are not replaced soon enough, they become sufficiently destroyed and do not perform their damping and spacing function. Soon thereafter, the ribs of the drive flange and the rear wheel hub make hammering contacts with one another. If no repairs are undertaken and the motorcycle is still driven, the drive ribs are damaged and often broken away, with the ribs of the hub generally failing first.

In making repairs a hub insert with its own ribs mounted on a disc is then installed in lieu of what remains and/or is thereafter intentionally cutaway of the original integral ribs of the hub. Also, the original hub of a rear wheel may be formed to receive this hub insert as an original part. Thereafter, the hub insert is easily replaced whenever the failure of resilient dampers, subsequently, causes any unwanted destruction of its drive ribs. Such destruction of drive ribs often occurs as the driving power is transmitted, when it should not be, in hopes of reaching a destination where help and/or repair services are available.

1 Claim, 8 Drawing Figures

PATENTED JUL 24 1973 3,747,720

INVENTOR.
M. LEROY JENSEN
BY
Roy Mattern Jr.
ATTORNEY

HUB INSERT FOR REAR WHEEL ASSEMBLIES OF MOTORCYCLES TO RECEIVE AND TRANSMIT DRIVING POWER

BACKGROUND OF INVENTION

During motorcycle operations, engine power transmitted to the rear wheel often passes through an assembly of interfitting drive structures, called drive ribs, lugs, plates or power transmitters, which are separated by resilient damping units often made of rubber and called dampers. Generally, a set of drive ribs are integrally formed on a final drive flange to which chain sprockets are interchangeably secured, and another set of drive ribs are integrally formed on a rear wheel hub.

When applying power during abrupt accelerations, the dampers undergo extensive compression making the overall ride smoother, but possibly causing some deterioration of the dampers. Such deterioration may be quite rapid when excessive clearances have resulted because of improper services and repairs or failure to maintain adequate maintenance services. For example, the failure to adequately tighten axle nuts often causes excessive axial clearance. Then during subsequent rapid accelerations, the dampers are deflected beyond their protective confines and their nibbling destruction commences. Once the dampers are on their way out, the voids left behind provide run up space for the drive ribs of final drive flange which then directly contact and often seriously impact the drive ribs of the rear wheel hub.

Although the resulting noise that is generated indicates to a rider that his motorcycle is in trouble, often times the driving power is still transmitted when it should not be, as he strives to reach a destination where help and/or repair services are available. Generally, at the time of repair, it is found the drive ribs, lugs, plates or power transmitters of the rear wheel hub have been severely damaged.

In the past an entire new rear wheel assembly had to be obtained and service time was consumed in making wheel spoke interchanges. For either repair services, substantial costs and time were involved. However, now the rear wheel hub while remaining as a part of the entire wheel assembly is machined so the remnants of the drive ribs are removed. Thereafter, a hub insert is secured to the rear wheel hub to again provide drive ribs in lieu of those previously severely damaged.

SUMMARY OF INVENTION

When motorcycle operations are often curtailed or abruptly ended upon partial and/or complete failure of the transmission of engine power through drive ribs, lugs, plates, or power transmitters, formed integrally and respectively in a wheel hub and in a final drive flange, repairs may now be made quickly and at a lower cost. Previously, an entire new rear wheel unit had to be installed, or rear wheel hubs had to be interchanged requiring extensive spoke manipulations. Now repairs are made quickly as the wheel assembly is left intact and the remains of damaged drive ribs are readily removed. Then a hub insert is secured in place, on this particular rear wheel hub, having its own drive ribs which replace the original, damaged and fully removed integral drive ribs. Often this is the only repair needed to get the motorcycle quickly back into operation again.

DRAWINGS OF A PREFERRED EMBODIMENT

Figures 7, 8:
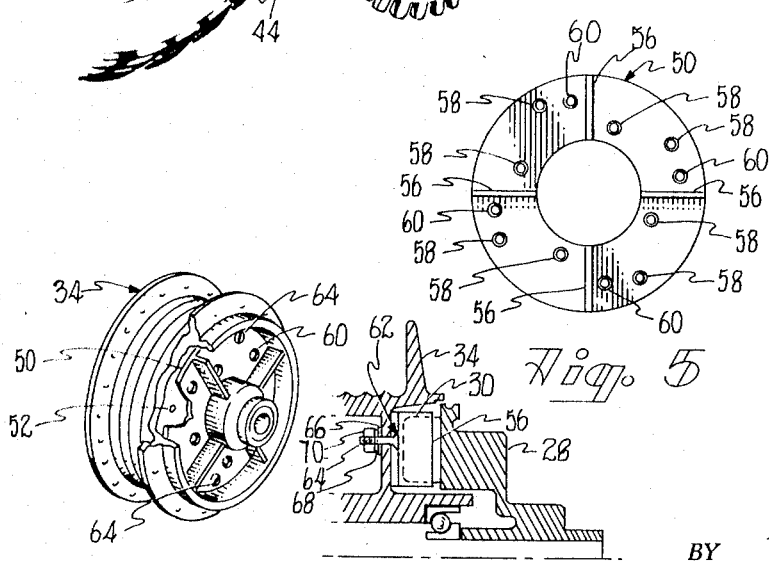

FIG. 7 is a perspective view of the rear wheel hub with the hub insert in place following the removal of all remnants of the original integral driving ribs of the rear wheel hub, thereby presenting new driving ribs to serve the same engine power transmitting function; and FIG. 8 is a partial cross sectional view taken axially through the wheel bearing, the final drive flange, the hub insert, and the rear wheel hub indicating the positioning and fastening of the hub insert and the resulting overlap of the respective radial driving ribs.

DESCRIPTION OF A PREFERRED EMBODIMENT

The Overall Drive System to the Rear Wheel of the Motorcycle

Figure 1:
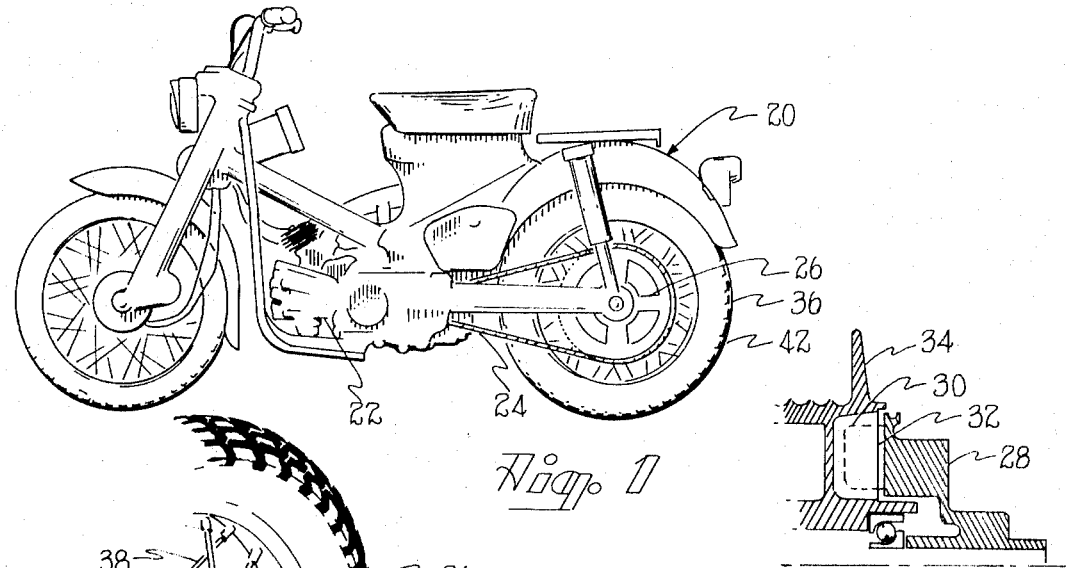
FIG. 1 is a side view of a motorcycle utilizing a chain and sprocket drive, wherein a final drive flange secured to sprocket and a rear wheel hub have intermeshing drive ribs spaced apart by dampers.
Figure 3:
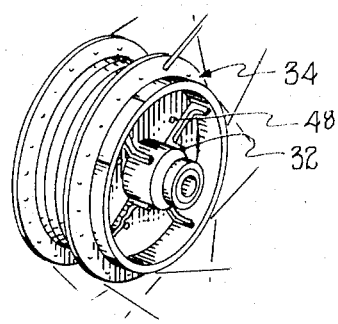
FIG. 3 is a partial cross sectional view taken axially through the wheel bearing, the final drive flange, and the rear wheel hub, indicating the axial overlap of the respective radial driving ribs.
Figure 2:
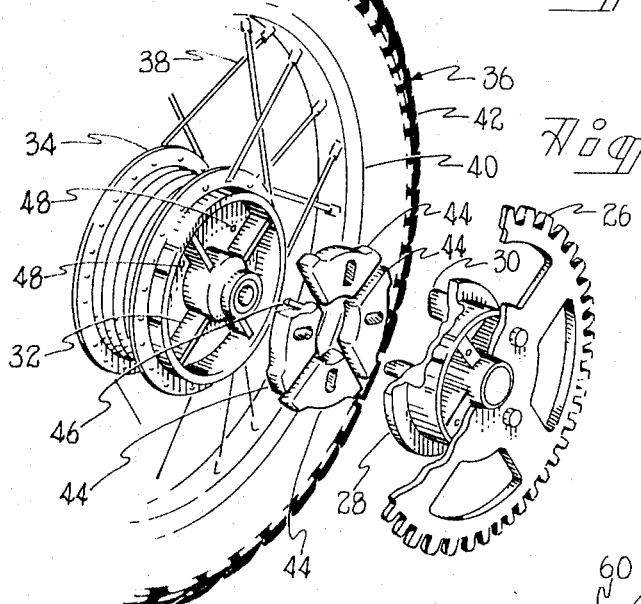
FIG. 2 is a partial perspective exploded view with some portions removed for clarity to show how the driving power is transmitted respectively through the rear sprocket, final drive flange, drive ribs of final drive flange, dampers, drive ribs of rear wheel hub, rear wheel hub, spikes, rim, and tire.

As illustrated in FIGS. 1, 2, and 3, on many motorcycles 20, the power of an engine 22 is transmitted to the rear by a drive chain 24 that passes around a rear sprocket 26. A final drive flange 28 is secured to sprocket 26 and is equipped with integral radially positioned drive ribs 30. Complementing these drive ribs 30 and to receive power from them are drive ribs 32 on the hub 34 of the rear wheel assembly 36, having spokes 38, rim 40, and tire 42. Between drive ribs 30 and 32, resilient damping units 44 are positioned. Each one has a positioning proturberance 46 grippingly insertable in a receiving hole 48 in rear wheel hub 34.

With these various components assembled, engine power transmitted by drive chain 24, turns rear sprocket 26 and final drive flange 28 with the drive ribs, lugs, plates or power transmitters 30 contacting dampers 44. They inturn contact integral drive ribs 32 of rear wheel hub 34 causing rear wheel assembly 36 to rotate thereby propelling motorcycle 20.

Breakdown of Drive Ribs of the Overall Drive System

The rear wheel resilient dampers 44 made of rubber and/or rubber like materials are subjected on occasions to destructive wear. This is especially true if any excessive axial clearance should develop between the final drive flange 28 and rear wheel hub 34. Thereafter, when power is applied creating abrupt accelerations, dampers 44 undergo extensive compression. Although the overall ride is smooth for awhile, the deflection of dampers 44 beyond their protective confines results in their nibbling destruction. Soon voids are created providing unwanted radial movement space for drive ribs 30 of final drive flange 28. They eventually seriously directly impact drive ribs 32 of rear wheel hub 34.

Although the resulting moise often indicates the need for repairs, they are not undertaken soon enough. Drive ribs 32 are often severely damaged and broken away so no forward motion occurs when engine power is transmitted through drive chain 24.

Hub Insert Installed in Overall Drive System

Upon the breakaway of drive ribs 32, in the past when repairs were undertaken, a new rear wheel assembly 36 was installed or more often a new rear wheel hub was installed. The hub change involved time consuming spoke changeovers. Either repair approach was costly and time consuming.

Figure 4:
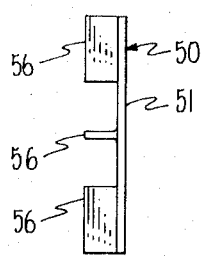
FIG. 4 is a perspective view principally of a rear wheel hub indicating how the integral drive ribs have been broken away by excessive power transmitting impacts.
Figure 5:
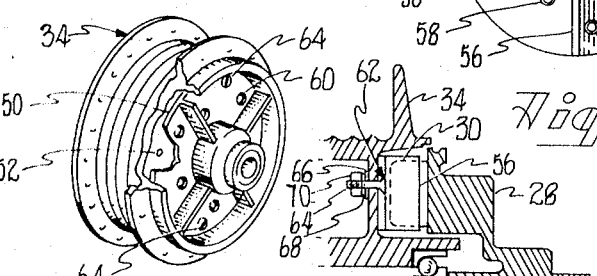
FIG. 5 is a view of the hub insert as viewed in the axial direction indicating the equal spacing of driving ribs and the location of holes to receive fasteners to secure it to the rear wheel hub and holes to receive the locating protuberances of the dampers.
Figure 6:
FIG. 6 is a view of the hub insert as viewed perpendicularly to the axial direction indicating the projecting driving ribs secured to a disc body of the hub insert and preferably being made integral therewith.

With a hub insert 50, now available, both time and costs are substantially reduced. Following the damage of drive ribs 32, as shown in FIG. 4, the rear wheel hub 34, while remaining a part of the entire rear wheel assembly 36, is machined to remove remanents of drive ribs 32. Then the disc body 51 of hub insert 50 is drilled to create fastener holes 58 and also damper protuberance receiving holes 60, or it is originally cast with such holes. Thereafter, hub insert 50, illustrated in FIGS. 5 and 6, is placed, as shown in FIG. 7, in the space formerly occupied in part by drive ribs 32. Hub insert 50 has its own upstanding, radially positioned drive ribs 56 preferably integrally formed on disc body 51. It completely fits into the overall space in which drive ribs 32 were formerly and integrally positioned. Also, hub 34 is then drilled, using the holes of the hub insert 50, as a pattern or guide to make corresponding fastener receiving holes 52 and damper protuberance receiving holes 48. Keeping the hub insert 50 in place so all the fastener receiving holes 52, 58 and damper protuberance receiving holes 48, 60 remain all simultaneously aligned, then fastener assemblies 62, each having a bolt 64, flat washer 66, lock washer 68 and nut 70, are used to secure hub insert 50 to rear wheel hub 34.

New dampers 44, each with a projecting protuberance 46, are located in the spaces between drive ribs 56 as their protuberances are gripplingly inserted through aligned holes 54 and 60. Subsequently, the rear wheel assembly 36 is reassembled, as indicated by the exploded perspective view of FIG. 2. Then motorcycle 20 is ready for operating once again, as the drive ribs 30 contact dampers 44 which inturn contact drive ribs 56 of hub insert 50.

Summary of Advantages of Installing a Hub Insert

Without any major design change of a motorcycle 20, it may be initially designed or it may be repaired by quickly inserting a hub insert 50 to place new driving ribs 56 in the overall transmission, in lieu of integral ribs 32 on rear wheel hub 34. The new driving ribs 56 are distributed about a disc body 51 to complement the drive ribs 30 on final drive flange 28.

As illustrated, motorcycle 20, requires four drive ribs 30 and four complementing drive ribs 32 or 56 to function properly. However, additional drive rib combinations may be required when more powerful motorcycles are manufactured.

On all motorcycles using such power transmission through driving ribs, lugs, plates or power transmitters, a complementary hub insert 50 is easily installed at comparitively lower cost. Therefore, dampers 44 may continue to be relied upon for their excellent damping characteristics. Yet, if they fail extensively, the installation of a hub insert 50 with its drive ribs 56 is readily and inexpensively undertaken to get motorcycle 20 back in operation again. Moreover, hub insert 50 of whatever resulting configuration, could be carried with fasteners 62 and dampers 44 during motorcycle trips and be installed, when necessary, by using conventional hand tools such as a file, wrench, screwdriver and/or pliers.

Generally, hub 34 of rear wheel assembly 36 is made of aluminium and hub insert 50 could also be made of aluminium. However, an alloy steel cast in the shape of hub insert 50, is preferred to present longer lasting drive ribs 56. Also, a built up welded hub insert 50 is useful, however, cast hub inserts 50 are available at lower cost and have proved to be very adequate in transmitting the engine power to rear wheel assembly 36.

I claim:

1. A motorcycle rear wheel hub insert for installation in the overall drive system of a motorcycle, which includes dampers directly installed to be in full contact at all times with driving ribs of a drive flange and driving ribs of a wheel hub assembly, to provide power receiving driven ribs integrally formed on a disc to replace removed damaged integral driven ribs of a motorcycle rear wheel hub which previously no longer transmitted adequate engine power to a rear wheel of the motorcycle, comprising a disc body sized to complementary fit portions of the circular space within a motorcycle rear wheel hub in which integral driven ribs of a rear wheel hub were originally located, having driven ribs integrally formed on the disc body to substantially match the power receiving performance of the former integral driven ribs of a rear wheel hub, the driven ribs on the disc body being sized to substantially fill the entire space defined by the axial openings left after installing power transmitting dampers adjacent to each of the driving ribs of the drive flange secured to the rear sprocket, and having a set of holes to receive fasteners to be used in securing the disc body of the hub insert to a hub of a rear wheel of a motorcycle, and another set of holes to receive protuberances of dampers which are directly installed to be in full contact at all times with respective sets of driving ribs of a driving flange and sets of driven ribs of a wheel hub assembly.

\* \* \* \* \*